United States Patent [19]

Kusaka et al.

[11] Patent Number: 4,812,636
[45] Date of Patent: Mar. 14, 1989

[54] AUTOMATIC FOCAL POINT CONTROL APPARATUS WITH CORRECTION OF SEQUENTIAL DEFOCUS SIGNALS DEPENDENT ON OBJECT CONTRAST

[75] Inventors: Yosuke Kusaka, Yokohama; Ken Utagawa, Kawasaki, both of Japan

[73] Assignee: Nikon Corporation, Tokyo, Japan

[21] Appl. No.: 173,023

[22] Filed: Mar. 23, 1988

Related U.S. Application Data

[63] Continuation of Ser. No. 863,065, May 14, 1986, abandoned.

[30] Foreign Application Priority Data

May 23, 1985 [JP] Japan .................................. 60-111144

[51] Int. Cl.⁴ .......................... G01J 1/20; G03B 13/18
[52] U.S. Cl. ..................................... 250/201; 354/408
[58] Field of Search .................. 250/201 PF, 204; 354/406–408; 356/123, 125

[56] References Cited

U.S. PATENT DOCUMENTS

| | | | |
|---|---|---|---|
| 4,297,571 | 10/1981 | Utagawa et al. | 250/201 |
| 4,306,143 | 12/1981 | Utagawa et al. | 250/201 |
| 4,336,450 | 6/1982 | Utagawa et al. | 250/201 |
| 4,447,719 | 5/1984 | Ogasawara | 354/409 |
| 4,474,449 | 10/1984 | Kusaka | 354/408 |

*Primary Examiner*—David C. Nelms
*Assistant Examiner*—Stephone B. Allen
*Attorney, Agent, or Firm*—Shapiro and Shapiro

[57] ABSTRACT

An automatic focal point control apparatus for optical equipment such as cameras can properly respond to different objects and changes in objects, thus providing stable operation. In the apparatus, defocus signals are calculated according to object image data concerning an object to be photographed, information effective for focal point calculation is extracted from the object image data, and the defocus signals are weighted and averaged by weighting coefficients corresponding to the effective information signals, thereby obtaining a statistical defocus signal.

15 Claims, 6 Drawing Sheets

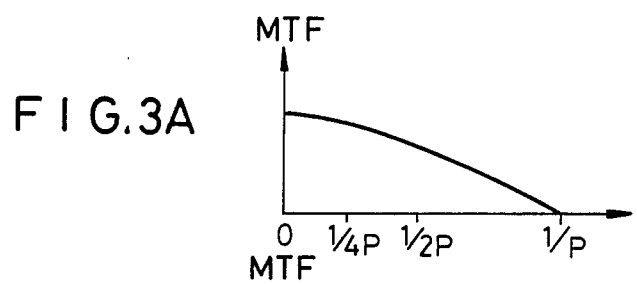
FIG. 3A
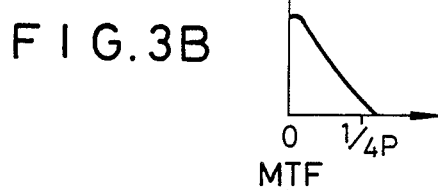
FIG. 3B
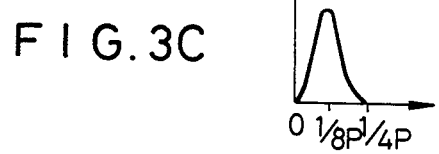
FIG. 3C
FIG. 4A
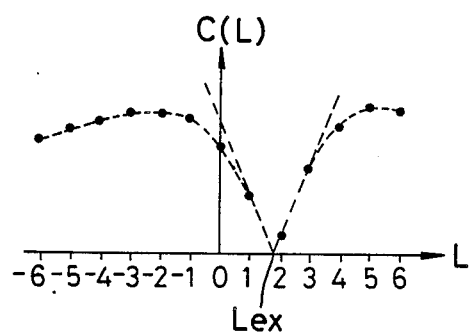
FIG. 4B
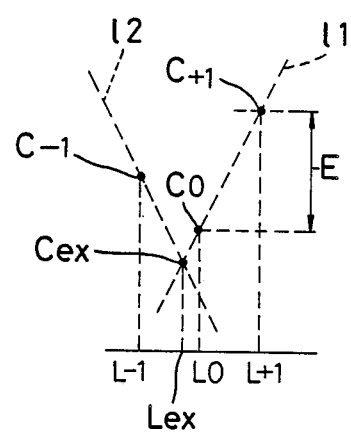

AUTOMATIC FOCAL POINT CONTROL APPARATUS WITH CORRECTION OF SEQUENTIAL DEFOCUS SIGNALS DEPENDENT ON OBJECT CONTRAST

This is a continuation application of Ser. No. 863,065 filed May 14, 1986, now abandoned.

BACKGROUND OF THE INVENTION

1. Field of the Invention

The present invention relates to an automatic focal point control apparatus suitable for optical equipment such as cameras.

2. Related Background Art

U.S. Pat. No. 4,447,719 describes a conventional automatic focal point control apparatus used in a camera. A relative deviation between a pair of object images formed by two light beams passing through two different portions of the exit pupil of a photographing lens is photoelectrically detected by two one-dimensional image sensors. Focus detection of the photographing lens is performed according to the detected deviation. The two one-dimensional image sensors have light-receiving surfaces and generate time-serial analog outputs corresponding to the light intensity distributions of the light-receiving surfaces, respectively ("light" here includes light components such as infrared rays excluding the visible light components). The time-serial analog outputs are calculated according to predetermined processing to obtain time-serial defocus signals. The defocus signal is defined as a signal representing a difference between an object image focal plane of the photographing lens and a prospective focal plane (a plane optically equivalent to the film surface), i.e., a signal representing a distance. The defocus signal consists of an absolute value and a sign (corresponding to a direction of focusing position corresponding to a prospective focal position). These defocus signals are multiplied with a predetermined weighting coefficient to obtain a weighted average thereof. The photographing lens is controlled and driven to focus the image according to the weighted average.

In a conventional automatic focal point control apparatus of this type, noise components in the time-serially generated defocus signals can be averaged and reduced to provide stable operation.

According to such a conventional automatic focal point control apparatus of this type, however, a sole weighting coefficient is multiplied with a plurality of defocus signals. When the object moves or changes, the sole weight coefficient is unsatisfactory to achieve accurate focal point control. For example, a user holds a camera and fails to keep the camera in the same position (e.g., the camera is accidentally moved during the shutter release), or the user intentionally pans the camera to change the object. In this case, a plurality of time-serially generated defocus signals correspond to different objects at the respective timings. The signals include coarse defocus signals corresponding to objects of low luminance or contrast subjected to relatively poor focal point detection and objects of high luminance or contrast subjected to relatively good focal point detection. When the defocus signals of different reliability levels are weighted by the sole weighting coefficient, the defocus signal of low reliability level is excessively weighted. The weighted average of the defocus signals then has poor reliability. As a result, when the photographing lens is driven or display is performed on the basis of such a weighted average, stable operation tends not to be guaranteed.

SUMMARY OF THE INVENTION

It is an object of the present invention to provide an automatic focal point control apparatus which can properly respond to different objects and changes in objects, thus providing stable operation.

In order to achieve the above object of the present invention, defocus signals are calculated according to object image data concerning an object to be photographed, information effective for focal point calculation is extracted from the object image data. and the defocus signals are weighted and averaged by weighting coefficients corresponding to the effective information signals, thereby obtaining a statistical defocus signal. The information effective for focal point calculation corresponds to an object contrast, an object luminance, and so on.

BRIEF DESCRIPTION OF THE DRAWINGS

FIGS. 3A, 3B and 3C are respectively graphs showing modulation transfer functions of filters;

FIGS. 4A and 4B are graphs for explaining a correlation value C(L) and a parameter E;

DETAILED DESCRIPTION OF THE PREFERRED EMBODIMENTS

Figure 1:
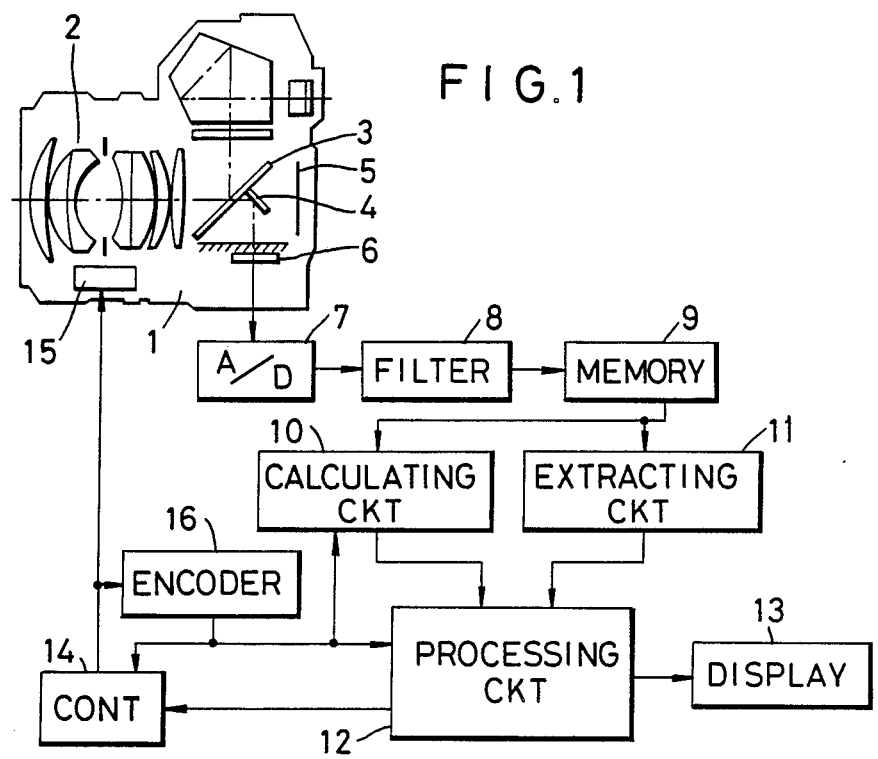
FIG. 1 is a block diagram of an automatic focal point control apparatus employed in a single-lens reflex camera.
Figure 2:
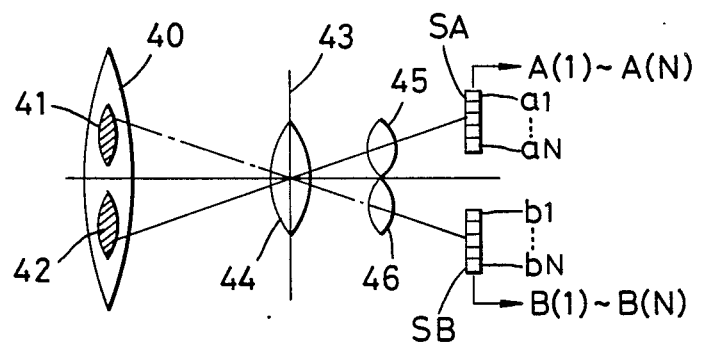
FIG. 2 is a sectional view of a focal point detection optical system.

Referring to FIG. 1, a light beam object is incident on a photographing lens 2 in a single-lens reflex camera 1. The beam from the lens 2 passes through a half mirror 3 and is reflected by a submirror 4. The reflected beam is incident on a photoelectric transducer element array 6 located at the equivalent position of a film surface 5. An object image is thus formed on the photoelectric transducer element array 6. The array 6 may be constituted by a pair of one-dimensional CCD image sensors SA and SB, as shown in FIG. 2. Light beams passing through first and second portions 41 and 42 of the exit pupil of a photographing lens 40 (corresponding to the lens 2 in FIG. 1) are respectively focused to form first and second object images near a prospective focal plane 43 of the photographing lens 40. The pair of image sensors SA and SB output photoelectric transducer outputs corresponding to luminance distributions of the object image, i.e., analog signals A(n) and B(n). The analog signals A(n) and B(n) are converted to digital signals Al(n) and Bl(n) by an analog-to-digital converter (to be referred to as an A/D converter hereinafter) 7. The signals Al(n) and Bl(n) are filtered by a filter 8 for filtering signal components of a predetermined frequency range. Signals a(n) and b(n) from the filter 8 are stored in a memory 9. The memory 9 is connected to a focal point calculating circuit 10 and an effective information extracting circuit 11.

The focal point calculating circuit 10 calculates object image data in the memory 9 according to focal point processing, and time-serially generates defocus signals d(i) corresponding to differences between the object focal planes and the film surface at the object image data generation timings.

A time interval T(i) between adjacent two time-serial defocus signals d(i) generated by the focal point calculation circuit 10 is determined by charge storage time of the image sensors SA and SB, time required for transferring data to the focal point calculation circuit 10, calculation time of the circuit 10, and so on. The time interval T(i) varies according to the object luminance range.

The effective information extracting circuit 11 calculates the number of pieces of information effective for focal point detection calculation (the information includes the object contrast and luminance) from the object image data a(n) and b(n) output from the memory 9. The extracting circuit 11 calculates the object image data according to predetermined processing and generates effective information signals E(i) time-serially in synchronism with the defocus signals d(i). Each object image data acquisition provides a pair of defocus and effective information signals d(i) and E(i). The larger the magnitude of the signal E(i), the higher the reliability of the defocus signal d(i).

The outputs of the focal point calculation circuit 10 and the effective information extracting circuit 11 are connected to the corresponding inputs of a statistical processing circuit 12. The processing circuit 12 receives a plurality of pairs of time-serial defocus and effective information signals d(i) and E(i). The processing circuit 12 performs different calculations for the plurality of defocus signals d(i) according to the corresponding effective information signals E(i), thereby obtaining statistical defocus signals $\overline{d(i)}$.

The statistical defocus signals $\overline{d(i)}$ are supplied to a display unit 13 and a lens driving control circuit 14. The display unit 13 displays a focal point control state of the photographing lens 2. The lens driving control circuit 14 including a motor is connected to a power transmission mechanism 15 including gears. The displacement, direction, speed and stop of the photographing lens 2 are controlled through the power transmission mechanism 15 on the basis of the statistical defocus signals $\overline{d(i)}$. The focal point is automatically controlled by displacing the lens 2 back and forth. The displacement of the photographing lens 2 is monitored by an optical encoder 16 such as a photo-interrupter. A lens displacement signal from the encoder 16 is fed back to the lens driving control circuit 14, thereby constituting a closed-loop servo lens-displacement control system using the statistical defocus signal $\overline{d(i)}$.

In order to drive the photographing lens in durations of charge storage of the CCD image sensors SA and SB, data transfer, and focal point detection calculation, as described in U.S. Pat. No. 4,387,975, the lens displacement signal is supplied to the focal point calculating circuit 10 or the statistical processing circuit 12 to correct the latest defocus signal on the basis of the defocus and statistical defocus signals generated at the latest generation timing, i.e., the defocus and statistical defocus signals used for displacement of the photographing lens, in consideration of the photographing lens displacement in such durations.

The elements described above will be described in more detail below. The focal point detection optical system in the single-lens reflex camera 1 shown in FIG. 1 is the same as that in FIG. 2. An object image corresponding to the first portion 42 of the exit pupil in FIG. 2 is formed on the image sensor SA in FIG. 2 and the image sensor SA generates time-serial analog signals A(n) (where n=1 to N). An object image corresponding to the second portion 41 is formed on the image sensor SB and the sensor SB generates time-serial analog signals B(n) (where n=1 to N).

The outputs A(n) and B(n) from the image sensors SA and SB are converted by the A/D converter 7 to digital data A1(n) and B1(n). The digital data A1(n) and B1(n) are filtered by the filter 8. Data a(n) and b(n) are output from the filter 8 and stored in the memory 9.

The filter 8 eliminates relatively high frequency components higher than the Nyquist frequency, which adversely affect the focal point detection calculation, and also eliminates relatively low frequency components close to DC components. These relatively high and low frequency components are included in the raw digital data A1(n) and B1(n). When the distance between the centers (to be referred as a pitch hereinafter) of the adjacent two light-receiving elements of the image sensor SA and SB is given as P, the Nyquist frequency is $\frac{1}{2}$P.

In order to eliminate the relatively high frequency components, i.e., components having a frequency of $\frac{1}{2}$P or higher, the following filtering calculations must be performed:

$$
\begin{aligned}
A2(n) &= 0.28 \times A1(n) + 0.76 \times A1(n + 1) + \\
&\quad A1(n + 2) + 0.76 \times A1(n + 3) + \\
&\quad 0.28 \times A1(n + 4) \\
B2(n) &= 0.28 \times B1(n) + 0.76 \times B1(n + 1) + \\
&\quad B1(n + 2) + 0.76 \times B1(n + 3) + \\
&\quad 0.28 \times B1(n + 4) \\
\text{for } n &= 1 \text{ to } (N - 4)
\end{aligned} \quad (1)
$$

The resultant modulation transfer function is shown in FIG. 3B. In this case, the frequency components of $\frac{1}{4}$P or higher can be substantially eliminated. In the subsequent calculations, even if the data is extracted at a sampling interval 2P which is twice the pitch P of the image sensor SA or SB, the components having frequencies higher than the Nyquist frequency (i.e., $\frac{1}{4}$P) for the sampling pitch 2P can be eliminated. Therefore, data with high precision can be acquired.

FIG. 3A shows a transfer function which depends on only the pitch and shape of the image sensors SA and SB.

In order to eliminate the relatively low frequency components from the data derived by equations (1), the following filtering calculations are performed:

$$a(n) = -0.5 \times A2(n) + A2(n+4) - 0.5 \times A2(n+8)$$

$$b(n) = -0.5 \times B2(n) + B2(n+4) - 0.5 \times B2(n+8)$$

$$\text{for } n = 1 \text{ to } M, M \leq N - 12 \quad (2)$$

The resultant modulation transfer function is shown in FIG. 3C. The relatively low frequency components can also be eliminated. In this case, the transfer function peak is $\frac{1}{8}$P. In other words, focal point detection operation can be performed using the data including the frequency component of $\frac{1}{8}$P among the spatial frequency components included in the object image data. The spatial frequencies are plotted along the abscissas in FIGS. 3A to 3C, and MTFs or modulation transfer functions are plotted along the ordinates therein.

The focal point calculation circuit 10 shifts the object image data a(n) and b(n) (where n=1 to M) stored in the memory 9 to obtain a shift value having the highest correlation therebetween, thereby calculating a relative deviation between the two images.

The following correlation calculation is performed to obtain the relative shift value:

$$C(L) = \sum_{i=q}^{r} |a(i) - b(i + L)| \quad (3)$$

where L is the parameter of the relative shift value between the data strings. The smaller the value C(L) obtained in equation (3) becomes, the higher the correlation between the two images becomes.

Values q and r are associated with the absolute value Lmax of the maximum shift value.

FIG. 4A is a graph obtained by plotting the relative shift values C(L) when the parameter L is varied in the range of −6 to +6. Assuming that the parameter L represents continuous values, L which gives a minimum C(L) is the relative shift value between the data a(n) and b(n). The correlation values C(L) can be obtained discretely for integers of the parameter L. Therefore, a true shift value Lex for the minimum correlation value C(L) is calculated by interpolation, as shown in FIG. 4B. For example, assuming that the absolute values of gradients (lines l1 and l2) of correlation functions C(L) with respect to the shift value Lex are the same, minimum values Cex and Lex of the correlation function C(L) are derived from correlation values $C_{-1}$, $C_0$ and $C_{+1}$ for shift integers at three points $L_{-1}$, $L_0$ and $L_{+1}$ near Lex.

Cex and Lex are given as follows:

Cex = $C_0$ − |DL|

Lex = $L_0$ + DL/E  (4)

In equation (4), the parameters DL and E represent the values in FIG. 4B and are calculated by:

DL = 0.5 × ($C_{-1}$ − $C_{+1}$)

E 32 Max {$C_{-1}$ − $C_0$, $C_{+1}$ − $C_0$}  (5)

The right-hand side of equation (5) indicates a larger one of the values $C_{-1}$ − $C_0$ and $C_{+1}$ − $C_0$.

when the shift value Lex is obtained, the defocus value d is:

d = β × Lex  (6)

where β is the value determined by the pitch P and the parameter of the optical characteristics or the like of the focal point detection optical system.

The effective information extracting circuit 11 extracts the effective information for focal point processing from the data stored in the memory 9, i.e., the object image data a(n) and b(n) calculated by the focal point calculation circuit 10. The "effective information" is defined as information associated with the object contrast and luminance. In the above case, since focal point detection is performed for the ⅛P spatial frequency component effective for focal point detection, the effective information extracting circuit 11 calculates the number of ⅛P frequency components included in the data a(n) and b(n). The calculation scheme of the effective information extracting circuit 11 will be described in detail below.

(i) FIRST EMBODIMENT

A first embodiment of the effective information extracting circuit 11 is constituted by a Fourier transform circuit. In this case, in order to extract the ⅛P spatial frequency component from the data a(n) and b(n), the Fourier transform calculation can be performed using equation (7) below:

$$E = \left| \sum_{n=1}^{M} a(n) \times \exp(2j\pi n/8) \right| + \left| \sum_{n=1}^{M} b(n) \times \exp(2j\pi n/8) \right| \quad (7)$$

Equation (7) represents a discrete Fourier transform for extracting the ⅛P spatial frequency component from the data a(n) and b(n).

(ii) SECOND EMBODIMENT

In a second embodiment of an effective information extracting circuit 11, based on the fact that the correction values C(L) given by equation (3) near its minimum value rapidly decrease when a larger number of ⅛P spatial frequency components are included in the original data a(n) and b(n), the parameter E calculated by equation (5) is used as an effective information signal E(i).

In the second embodiment of the effective information extracting circuit 11, additional calculations such as equation (7) for the effective information extraction calculations need not be performed, unlike in the first embodiment of the extracting circuit 11. The focal point detection parameters E can also be obtained for the effective information extraction calculation. When the parameters E calculated by the focal point calculation circuit 10 are used for this purpose, the effective information extracting circuit 11 is assumed to be included in the focal point calculating circuit 10.

(iii) OTHERS

The effective information extracting circuit 11 is not limited to the arrangements in the first and second embodiments thereof. Any arrangements can be employed if information is effective for the object data focal point detection. For example, if the object contrast is low, the effectiveness is regarded to be low; and if the object contrast is high, the effectiveness is regarded to be high:

$$E = \sum_{N=1}^{M} \{|a(n) - a(n - l)| + |b(n) - b(n - l)|\} \quad (8)$$

where l is an arbitray value and M is the number of data. By equation (8), the contrast signals are calculated and can be used as effective information signals E.

Differentiated values Dm used in the focal point detection system described in U.S. Pat. No. 4,333,077, i.e., just-in-focus differentiated values of a function Vi for detecting a relative deviation between the two images, are correlated with the defocus signal reliability and spatial frequency components effective for focal point detection. Therefore, the differentiated values can also be used as the effective information signals E.

The statistical processing circuit 12 will be described in detail.

(i) FIRST EMBODIMENT

Weighting coefficients corresponding to the magnitudes of the effective information signals are multiplied with k previous defocus signals. The products are then averaged to obtain a statistical defocus signal $\overline{d(i)}$. Assuming that the latest defocus signal is d(i) and a latest effective information signal to be paired therewith is E(i), the statistical defocus signal $\overline{d(i)}$ is given as follows:

$$\overline{d(i)} = \{E(i) \times d(i) + E(i-1) \times d(i-1) + \ldots + E(i-k+1) \times d(i-k+1)\}/S(i) \quad (9)$$

for $S(i) = E(i) + E(i-1) + \ldots + E(i-k+1)$

A detailed circuit arrangement of the statistical processing circuit 12 on the basis of equation (9) will be described with reference to FIG. 5.

Figure 5:
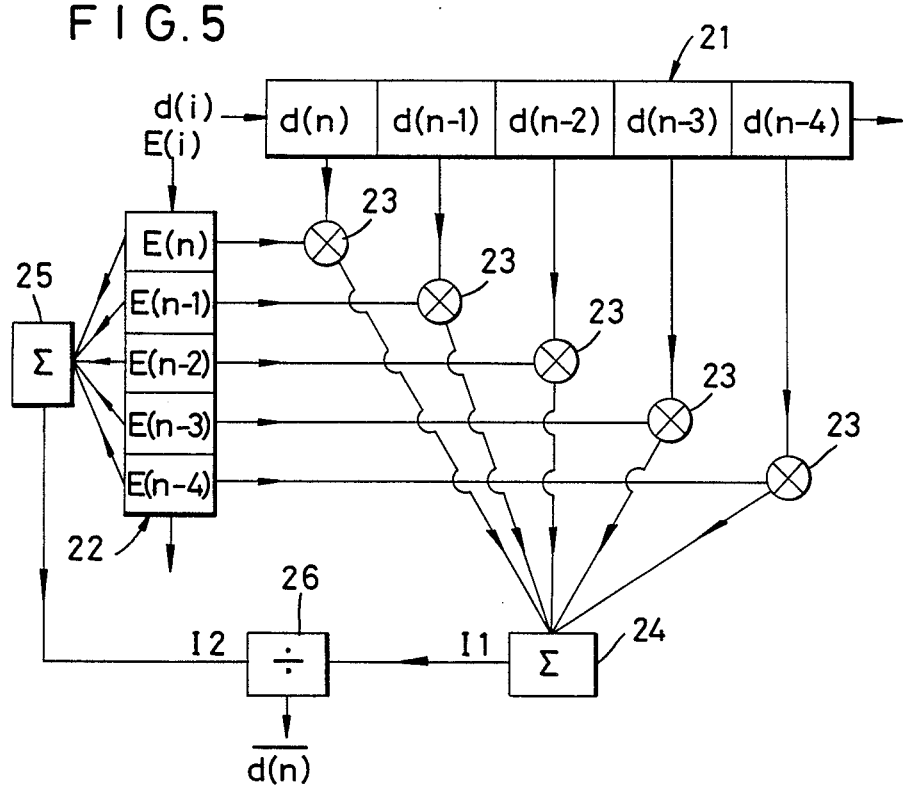
FIGS. 5 and 6 are respectively circuit diagrams showing first and second embodiments of statistical processing circuits according to the present invention.

FIG. 5 shows a first embodiment of the statistical processing circuit 12 if k=5. The time-serial defocus signals d(i) from the focal point calculating circuit 10 are sequentially supplied to, stored and shifted in a shift register 21. The effective information signals E(i) to be paired with the defocus signals d(i) are sequentially supplied from the effective information extracting circuit 11 to a shift register 22 and sequentially stored and shifted therein in synchronism with the defocus signals d(i). In the state shown in FIG. 5, the latest defocus and effective information signals d(n) and E(n) are respectively stored in the shift registers 21 and 22, respectively. More particularly, the signals d(n) to d(n−4) and the signals E(n) to E(n−4) are respectively stored in the registers 21 and 22. The five different data outputs from the shift register 21 are respectively multiplied with the five data outputs from the shifter register 22 by five multipliers 23. The products are supplied to and added by an adder 24. Therefore, an output I1 from the adder 24 is:

$$I1 = E(n) \times d(n) + E(n-1) \times d(n-1) + E(n-2) \times d(n-2) + E(n-3) \times d(n-3) + E(n-4) \times d(n-4) \quad (10)$$

The effective information signals E(n) to E(n−4) stored in the shift register 22 are supplied to and added by an adder 25. Therefore, an output I2 from the adder 25 is given as follows:

$$I2 = E(n) + E(n-1) + E(n-2) + E(n-3) + E(n-4) \quad (11)$$

The outputs I1 and I2 are supplied to a divider 26. The divider 26 performs the following calculation:

$$I3 = I1/I2 = \overline{d(n)} \quad (12)$$

The nth statistical defocus signal $\overline{d(n)}$ corresponding to the pair of nth data d(n) and E(n) can be obtained. The statistical defocus signal $\overline{d(n)}$ is supplied to the display unit 13 and the lens driving control circuit 14.

With the above arrangement, if the user accidentally moves the camera during the shutter release or the object crosses the object optical path, the latest defocus signal d(n) has poor reliability. However, in such a case, the weighting coefficient defined by the corresponding effective information signal E(n) is also decreased. A small weighting coefficient is multiplied with a defocus signal derived from a small number of pieces of effective information and a large weighting coefficient is multiplied with a defocus signal derived from a large number of pieces of effective information. Therefore, stable, well-balanced statistical defocus signals can be obtained.

(ii) SECOND EMBODIMENT

Figure 6:
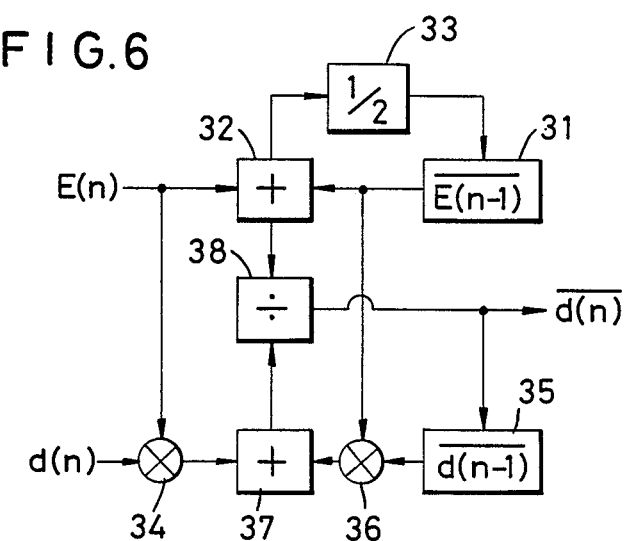

FIG. 6 shows a second embodiment of the statistical processing circuit 12. Assume that a latest defocus signal d(n) and a latest effective information signal E(n) to be paired therewith are obtained at a given timing. The nth effective information and defocus signals E(n) and d(n) are supplied to and multiplied by a multiplier 34. The (n−1)th statistical signal $\overline{d(n-1)}$ stored in a register 35 is multiplied by a multiplier 36 with the (n−1)th statistical effective information signal $\overline{E(n-1)}$. The products from the multiplier 34 and 36 are added by an adder 37. An output from the adder 37 is given as follows:

$$\{E(n) \times d(n) + \overline{E(n-1)} \times \overline{d(n-1)}\}$$

The nth effective information signal E(n) is added to the (n−1)th statistical effective information signal $\overline{E(n-1)}$ by the adder 32. A sum from the adder 32 is supplied to a divider 38. The divider 38 performs the following calculation:

$$\overline{d(n)} = \{E(n) \times d(n) + \overline{E(n-1)} \times \overline{d(n-1)}\}/\{E(n) + \overline{E(n-1)}\} \quad (13)$$

The nth statistical defocus signal $\overline{d(n)}$ can be obtained. The signal $\overline{d(n)}$ is supplied to the lens driving control circuit 14 and the display unit 13 to perform lens position adjustment. The signal $\overline{d(n)}$ is also supplied to the register 35 and stored as the nth data $\overline{d(n)}$. The sum from the adder 32 is divided by 2 by a divider 33. A quotient $(E(n) + \overline{E(n-1)}) \times \frac{1}{2}$ is stored as the nth statistical effective information signal $\overline{E(n)}$ in the register 31.

According to the second embodiment of the statistical processing circuit 12, the data to be stored during the calculations is limited to $\overline{d(i)}$ and E(i). Compared to the first embodiment of the circuit 12 in FIG. 5, the number of registers or memories can be reduced.

If the nth statistical effective information signal $\overline{E(n)}$ is excessively large and tends to degrade the precision in association with the previous data focus signals, the nth statistical effective information signal $\overline{E(n)}$ may be given as:

$$\overline{E(n)} = \text{Min}\{Em, (E(n) + \overline{E(n-1)})/2\} \quad (14)$$

The upper limit of the signal $\overline{E(n)}$ may thus be limited by a maximum value Em and the nth statistical effective information signal $\overline{E(n)}$ may be stored in a predetermined memory area. The right-hand side of equation (14) indicates that a smaller one of the values Em and $(E(n) + \overline{E(n-1)})/2$ is selected.

(iii) THIRD EMBODIMENT

Since the response time is significant when lens driving control is performed in response to the statistical defocus signal d(i), a third embodiment will be described wherein the concept of response time is incorporated in the statistical technique described above. The third embodiment utilizes a microcomputer for performing focal point calculation and statistical processing. The main feature of this embodiment lies in the following point. The time intervals between the time-serial defocus signals, i.e., a time interval T(i) between the ith defocus signal d(i) and the (i−1)th defocus signal d(i−1) is monitored. If the time interval T(i) is shortened, the previous statistical defocus signal is weighted with a larger weighting coefficient. However, when the time interval T(i) is prolonged, a weighting coefficient for the latest defocus signal is increased.

Figure 7:
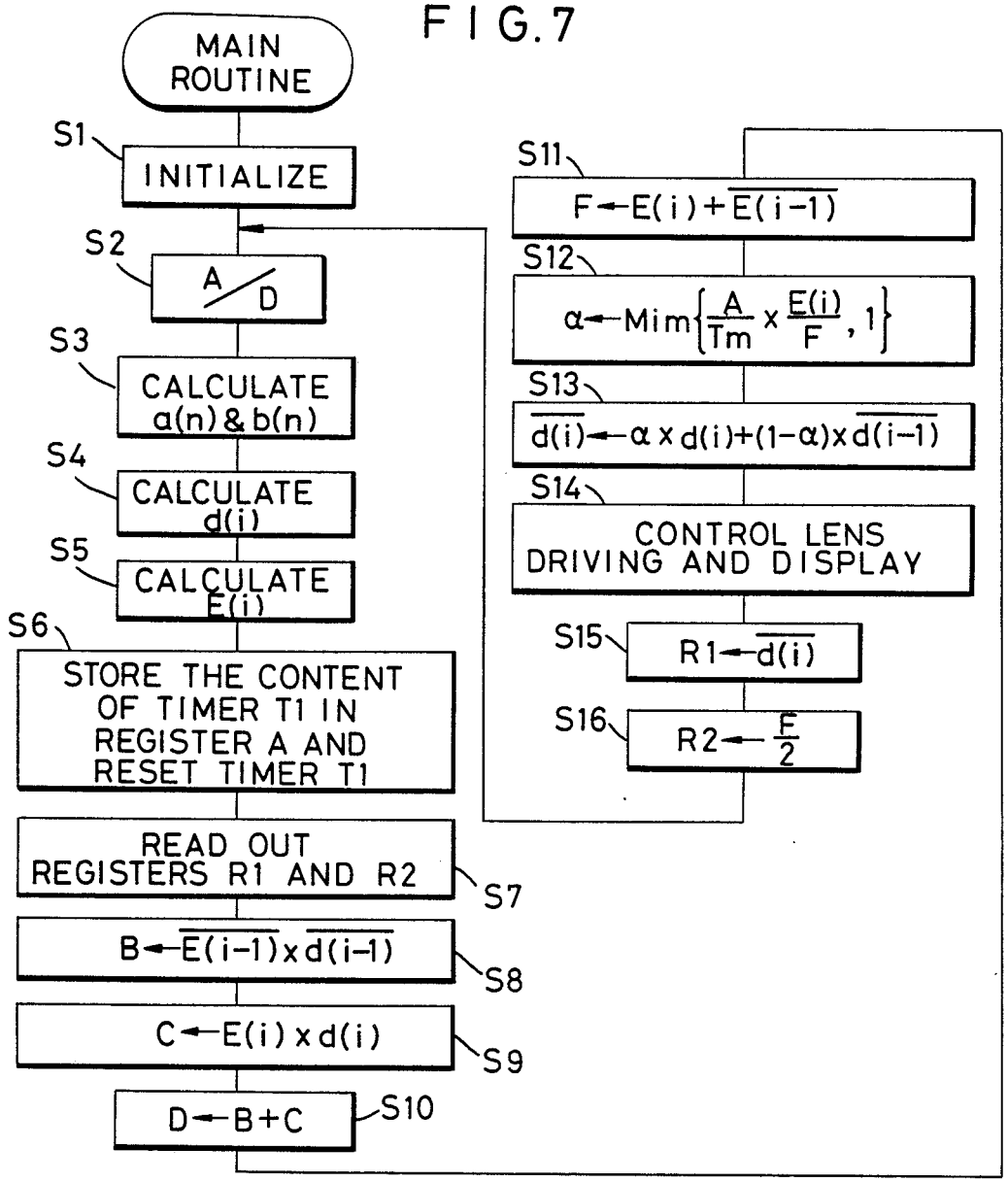
FIGS. 7 to 9 are respectively flow charts for explaining third to fifth embodiments of statistical processing circuits according to the present invention.

Referring to FIG. 7, each equipment and each element are initialized in step S1. In step S2, the analog signals A(n) and B(n) from the image sensors SA and SB are A/D-converted to produce the digital signals A1(n) and B1(n). In step S3, the digital signals A1(n) and B1(n) are filtered to obtain data a(n) and b(n). In step S4, the defocus signal d(i) is calculated according to equation (6). In step S5, the effective information signal E(i) is calculated by equation (5). In step S6, the value of a timer T1 incorporated in the microcomputer is set in a register A incorporated in the microcomputer so as to monitor the time interval T(i) of the defocus signals d(i) and the timer T1 is reset and restarted. In step S7, the previous signals $\overline{d(i-1)}$ and $\overline{E(i-1)}$ respectively stored in registers R1 and R2 are read out. The registers R1 and R2 are incorporated in the microcomputer. In step S8, $\overline{E(i-1)} \times \overline{d(i-1)}$ is calculated and the product is stored in the register B. In step S9, E(i)×d(i) is calculated and the product is stored in a register C. The registers B and C are incorporated in the microcomputer. In step S10, the contents of the registers B and C are added and the sum is stored in a register D. In step S11, $E(i) + \overline{E(i-1)}$ is calculated and the sum is stored in a register F. The register D and F are incorporated in the microcomputer. In step S12, a smaller one of A/Tm×E(i)/F (where Tm is the reference time interval) and 1 is given as α and α is stored in a predetermined memory area. In step S13, the statistical defocus signal $\overline{d(i)}$ is calculated as follows:

$$\overline{d(i)} = \alpha \times d(i) + (1-\alpha) \times \overline{d(i-1)} \quad (14)$$

In step S14, lens driving control and display are performed using the resultant $\overline{d(i)}$. In step S15, the latest $\overline{d(i)}$ is stored in the register R1. In step S16, $\{E(i) + \overline{E(i-1)}\}/2$ is stored in the register R2.

(iv) FOURTH EMBODIMENT

Figure 8:
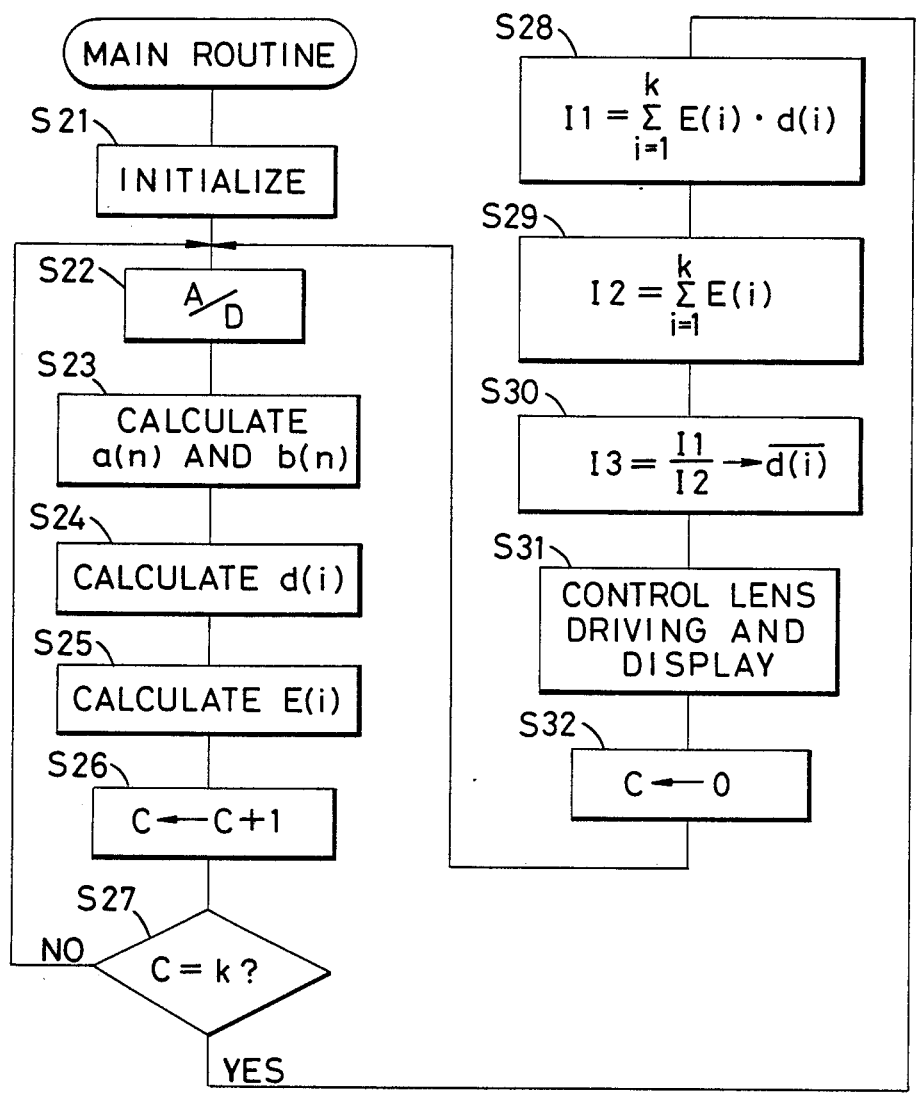

A fourth embodiment of the statistical processing circuit 12 is constituted by the microcomputer. The fourth embodiment of the statistical processing circuit 12 will be described with reference to FIG. 8.

Steps S21 to S25 are the same as those of steps S1 to S5 in FIG. 7, and a detailed description thereof will be omitted. After the defocus signal d(i) and the effective information signal E(i) are calculated, the flow advances to step S26. In step S26, an internal counter C for counting the number of pairs of d(i) and E(i) is incremented by one. In step S27, the microcomputer checks if the count of the counter C exceeds a predetermined number k. If C≠k, then the flow returns to step S22. The operations in steps S22 to S26 are repeated to calculate the defocus signal d(i) and the effective information signal E(i) and to increment the counter C by one. If YES in step S27, k defocus signals d(i) and k effective information signals E(i) have been calculated. The flow advances to step S28. In step S28, the following calculation is performed:

I1 = E(k)×d(i)+E(i−1)×d(i−1)+...
 +E(i−k+1)×d(i−k+1)

In step S29, the following calculation is performed:

I2 = E(i)+E(i−1)+...E(i−k+1)

In step S30, the following calculation is performed:

I3 = I1/I2

The statistical defocus signal $\overline{d(i)} = I3$ is thus calculated. Lens driving control and display are performed using the resultant $\overline{d(i)}$. In step S32, the counter C is reset to zero. The following steps (not shown) are performed and then the flow returns to step S22.

(v) FIFTH EMBODIMENT

A fifth second embodiment of the statistical processing circuit 12 is also constituted by using the microcomputer. The fifth embodiment of the statistical processing circuit 12 will be described with reference to FIG. 9.

Figure 9:
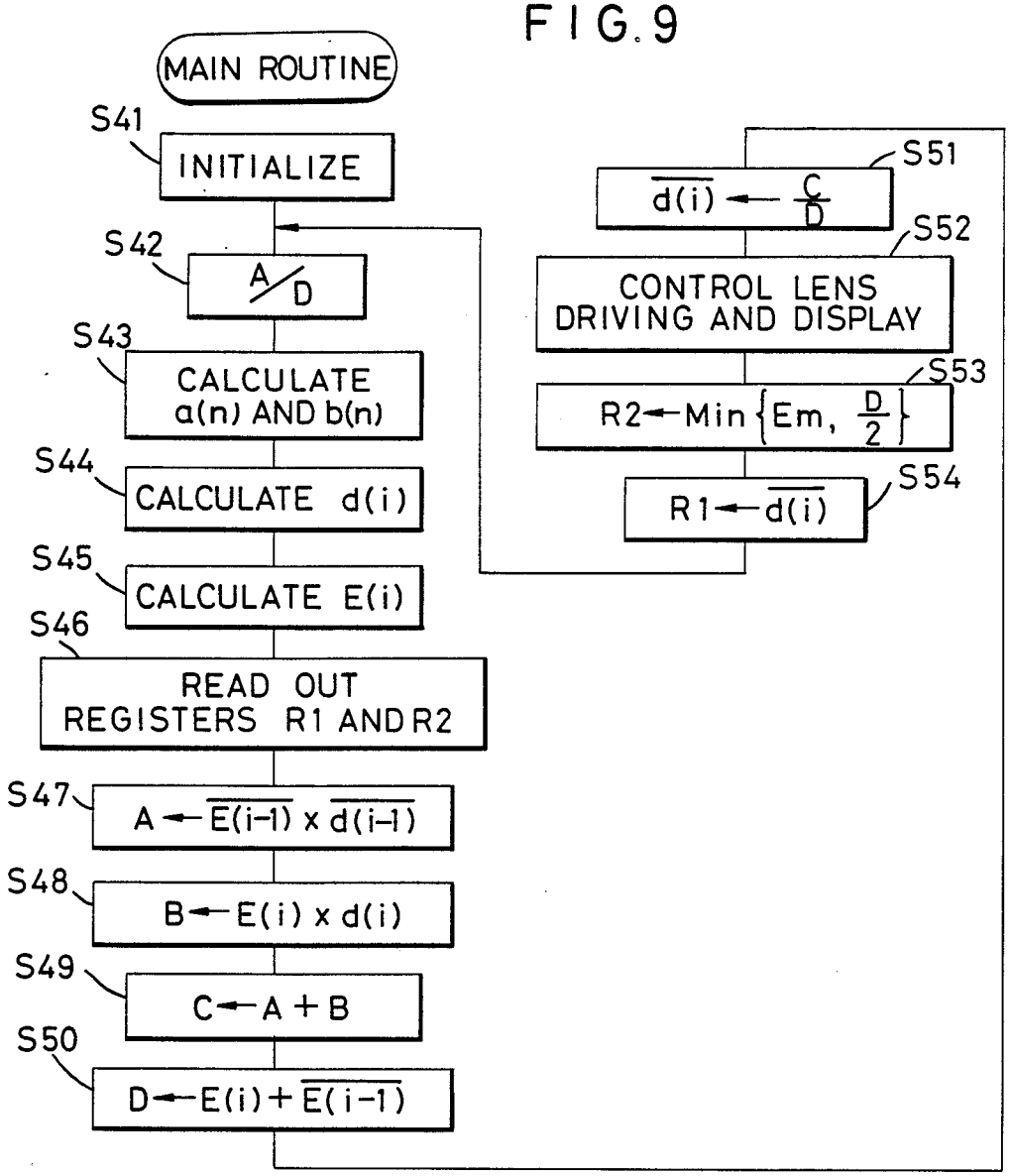

Steps S41 to S45 in FIG. 9 are the same as those of steps S1 to S5 in FIG. 7, and a detailed description thereof will be omitted. In step S46, the statistical defocus signal $\overline{d(i-1)}$ and the effective information signal $\overline{E(i-1)}$ are respectively read out from registers R1 and R2. In step S47, they are multiplied and the product is stored in the register A. In step S48, the current defocus signal D(i) is multiplied with the current effective information signal E(i) and the product is stored in the register B. In step S49, the values in the registers A and B are added to each other and the sum is stored in the register C. In step S50, the latest effective information signal E(i) is added to the previous statistical effective information signal $\overline{E(i-1)}$ and the sum is stored in the register D. In step S51, the value in the register C is divided by the value in the register D to obtain the statistical defocus signal $\overline{d(i)}$ which is then stored in a predetermined memory area. In step S52, lens driving control and display are performed using the statistical defocus signal $\overline{d(i)}$. In step 53, a smaller one of Em and the quotient obtained by dividing the value of the register D by 2 according to equation (14) is stored in the register R2. Finally, the current statistical defocus signal d(i) used for lens driving control is stored in the register R1. The subsequent steps (not shown) are performed, and then the flow returns to step S42.

In the focal point detection calculations described above, the pupil division type optical system in FIG. 2 is exemplified. However, a contrast detection type system or a two-image matching type system using external light can be used. The present invention is applicable to any focal point detection calculations if the defocus signals can be time-serially generated. The statistical technique may be used for only focal point detection in a region near the just-in-focus point. For other regions, a predetermined weighting constant may be multiplied with the defocus signals as in the conventional manner.

What is claimed:

1. An apparatus for causing a focusing optical system to form an object image on a predetermined surface, including:
   (a) means for detecting a light intensity distribution of light from an object on the predetermined surface and sequentially producing object image data;
   (b) defocus signal producing means responsive to said object image data for time-serially producing defocus signals representing a positional relationship between said predetermined surface and said object image;

(c) contrast detecting means responsive to said object image data for time-serially producing contrast information signals each of which represents a value conforming to a contrast of said object image, the value of each of said contrast information signals decreasing in response to a decrement of the contrast of said object image;

(d) calculating means responsive to said defocus signal producing means and said contrast detecting means for calculating a weighted average of a plurality of said defocus signals by using a corresponding number of said contrast information signals as weighting coefficients with respect said weighted average and thereafter producing a weighted average defocus signal conforming to the calculated weighted average, each of said plurality of said defocus signals corresponding, respectively, to each of said corresponding number of said contrast information signals; and (e) driving means for driving said focusing optical system in response to said weighted average defocus signal.

2. An apparatus according to claim 1, wherein said defocus signal producing means produces each of said defocus signals in response to each of said contrast signals.

3. An apparatus according to claim 1, wherein said contrast detecting means Fourier-transforms said object image data to said contrast information signals.

4. An apparatus according to claim 3, wherein said calculating means has means for time-serially storing a predetermined number of said defocus signals therein and means for time-serially storing said predetermined number of said contrast information signals therein.

5. An apparatus according to claim 4, wherein said contrast detecting means produces each of said contrast information signals in synchronism with each of said defocus signals.

6. An apparatus for causing a focusing optical system to form an object image on a predetermined surface, including:

(a) means for detecting a light intensity distribution of light from an object on the predetermined surface and sequentially producing object image data;

(b) producing means responsive to said object image data for time-serially producing contrast information signals and defocus signals, each of said contrast information signals representing a value conforming to a contrast of said object image, each of defocus signals representing a positional relationship between said predetermined surface and said object image, the value of each of said contrast information signals decreasing in response to a decrement of the contrast of said object image;

(c) calculating means responsive to said producing means for calculating a weighted average of a plurality of said defocus signals by using a corresponding number of said contrast information signals as weighting coefficients of said weighted average and thereafter producing a weighted average defocus signal conforming to the calculated weighted average, each of said plurality of said defocus signals corresponding, respectively, to each of said corresponding number of said contrast information signals; and (d) driving means for driving said focusing optical system in response to said weighted average defocus signal 7. An apparatus according to claim 6, wherein said calculating means has means for time-serially storing a predetermined number of said defocus signals therein and means for time-serially storing said predetermined number of said contrast information signals therein.

8. An apparatus according to claim 7, wherein said producing means produces each of said contrast information signals in synchronism with each of said defocus signals.

9. An apparatus for causing a focusing optical system to form an object image on a predetermined surface, including:

(a) means for detecting a light intensity distribution of light from an object on the predetermined surface and sequentially producing object image data;

(b) defocus signal producing means responsive to said object image data for time-serially producing defocus signals representing a positional relationship between said predetermined surface and said object image;

(c) contrast detecting means responsive to said object image data for time-serially producing contrast information signals each of which represents a value conforming to a contrast of said object image, the value of each of said contrast information signals decreasing in response to a decrement of the contrast of said object image;

(d) calculating means responsive to said defocus signal producing means and said contrast detecting means for multiplying each of a plurality of said defocus signals by a respective coefficient of a number of coefficients corresponding to said plurality of defocus signals to calculate a weighted average of said plurality of defocus signals and to produce a weighted average defocus signal conforming to the calculated weighted average, said calculating means determining each of said coefficients so that a value thereof decreases in response to a decrement of the value of a corresponding contrast signal; and (e) driving means for driving said focusing optical system in response to said weighted average defocus signal.

10. An apparatus for causing a focusing optical system to form an object image on a predetermined surface, including:

(a) means for detecting a light intensity distribution of light from an object on the predetermined surface and sequentially producing object image data;

(b) defocus signal producing means responsive to said object image data for time-serially producing defocus signals representing a positional relationship between said predetermined surface and said object image;

(c) effective information means responsive to said object image data for time-serially producing effective information signals each of which represents a value conforming to at least a contrast of said object image, the value of each of said effective information signals decreasing in response to a decrement of the contrast of said object image; and (d) calculating means responsive to said defocus signal producing means and said effective information means for calculating a weighted average of a plurality of said defocus signals by using a corresponding number of said effective information signals as weighting coefficients with respect to said weighted average and thereafter producing a weighted average defocus signal conforming to the calculated weighted average, each of said plurality of said defocus signals corresponding, respectively, to each of said corresponding number of said effective information signals.

11. An apparatus according to claim 10, which further comprises means for driving said focusing optical system in response to said weighted average defocus signal.

12. An apparatus according to claim 10, which further comprises means for performing a display conforming to said weighted average defocus signal.

13. An apparatus for causing a focusing optical system to form an object image on a predetermined surface, including:
  (a) means for detecting a light intensity distribution of light from an object on the predetermined surface and sequentially producing object image data;
  (b) defocus signal producing means responsive to said object image data for time-serially producing defocus signals representing a positional relationship between said predetermined surface and said object image;
  (c) time interval detecting means responsive to said defocus signals for time-serially producing time interval detecting signals each of which represents a time interval between production of two successive defocus signals;
  (d) weighting means responsive to said time interval detecting signals for time-serially producing weighting signals, the value of each of said weighting signals decreasing in response to a decrement of the time interval represented by a corresponding time interval detecting signal; and
  (e) calculating means responsive to said defocus signal producing means and said weighting means for calculating a weighted average of a plurality of said defocus signals by using a corresponding number of said weighting signals as weighting coefficients with respect to said weighted average and thereafter producing a weighted average defocus signal conforming to the calculated weighted average, each of said plurality of said defocus signals corresponding, respectively, to each of said corresponding number of said weighting signals.

14. An apparatus according to claim 13, which further comprises means for driving said focus optical system in response to said weighted average defocus signal.

15. An apparatus according to claim 13, which further comprises means for performing a display conforming to said weighted average defocus signal.

* * * * *